(12) United States Patent
Zhai et al.

(10) Patent No.: US 12,565,875 B2
(45) Date of Patent: Mar. 3, 2026

(54) WIRELESS POWER SUPPLY SYSTEM FOR SUPERCONDUCTING OFFSHORE WIND TURBINE

(71) Applicant: Hunan University, Hunan (CN)

(72) Inventors: Yujia Zhai, Changsha (CN); Liufei Shen, Changsha (CN); Xingzheng Wu, Changsha (CN); Tingkun Weng, Changsha (CN); Zhiqiang Zheng, Changsha (CN); Long Chen, Changsha (CN); Shuai Liu, Changsha (CN); Litong Zhu, Changsha (CN); Jinduo Wang, Changsha (CN); Shoudao Huang, Changsha (CN)

(73) Assignee: Hunan University, Changsha (CN)

( * ) Notice: Subject to any disclaimer, the term of this patent is extended or adjusted under 35 U.S.C. 154(b) by 0 days.

(21) Appl. No.: 18/807,577

(22) Filed: Aug. 16, 2024

(65) Prior Publication Data

US 2025/0389254 A1      Dec. 25, 2025

(30) Foreign Application Priority Data

Jun. 24, 2024    (CN) .......................... 202410822455.5

(51) Int. Cl.
| | |
|---|---|
| *F03D 9/25* | (2016.01) |
| *F03D 15/10* | (2016.01) |
| *F03D 80/60* | (2016.01) |
| *H02K 7/18* | (2006.01) |
| *H02K 55/04* | (2006.01) |

(52) U.S. Cl.
CPC .............. *F03D 9/25* (2016.05); *F03D 15/10* (2016.05); *F03D 80/60* (2016.05); *H02K*
*7/1838* (2013.01); *H02K 55/04* (2013.01); *F05B 2220/7068* (2013.01)

(58) Field of Classification Search
CPC ............ F03D 9/25; F03D 15/10; F03D 80/60; H02K 7/1838; H02K 55/04; F05B 2220/7068
USPC ...................................................... 290/44, 55
See application file for complete search history.

(56) References Cited

U.S. PATENT DOCUMENTS

| | | | | | |
|---|---|---|---|---|---|
| 3,742,265 | A | * | 6/1973 | Smith, Jr. | .............. H02K 55/00 |
| | | | | | 310/198 |
| 3,845,639 | A | * | 11/1974 | Smith, Jr | ................ H01F 6/065 |
| | | | | | 62/505 |

(Continued)

Primary Examiner — Charles Reid, Jr.
(74) Attorney, Agent, or Firm — Bochner PLLC; Andrew D. Bochner

(57) ABSTRACT

A wireless power supply system for a superconducting offshore wind turbine is provided, relates to the technical field of offshore wind power generation, and includes a shell, and a vacuum Dewar flask, a superconducting motor and rotary flux-pump wireless power supply device which are arranged inside the shell. A refrigerating apparatus is rotatably arranged inside the vacuum Dewar flask. An outer rotor and an inner rotor of the rotary flux-pump wireless power supply device rotate differentially. Permanent magnets on the outer rotor induce a direct-current output voltage on high-temperature superconducting stator strips on the inner rotor, to input a direct current to the excitation windings of the superconducting motor, so as to form a magnetic field, and induce an output voltage at the armature winding of the superconducting motor.

20 Claims, 3 Drawing Sheets

(56)        References Cited

U.S. PATENT DOCUMENTS

| | | | | |
|---|---|---|---|---|
| 3,898,490 | A * | 8/1975 | Wedman | H02K 55/00 |
| | | | | 310/52 |
| 3,904,901 | A * | 9/1975 | Renard | H02K 55/04 |
| | | | | 310/52 |
| 3,999,093 | A * | 12/1976 | Kirtley, Jr. | H02K 55/04 |
| | | | | 310/201 |
| 4,120,169 | A * | 10/1978 | Eckels | H02K 55/04 |
| | | | | 62/50.7 |
| 7,992,409 | B1 * | 8/2011 | Cooper | B01D 53/002 |
| | | | | 95/228 |
| 2002/0145940 | A1 * | 10/2002 | Terentiev | H02K 49/106 |
| | | | | 366/273 |

* cited by examiner

WIRELESS POWER SUPPLY SYSTEM FOR SUPERCONDUCTING OFFSHORE WIND TURBINE

CROSS-REFERENCE TO RELATED APPLICATION

This patent application claims the benefit and priority of Chinese Patent Application No. 202410822455.5 filed with the China National Intellectual Property Administration on Jun. 24, 2024, the disclosure of which is incorporated by reference herein in its entirety as part of the present application.

TECHNICAL FIELD

The present disclosure relates to the technical field of offshore wind power generation, in particular to a wireless power supply system for a superconducting offshore wind turbine.

BACKGROUND

Compared with the economically exploitable wind resources on land, offshore wind energy has advantages, such as high reserves, high wind speed, less dust, small turbulence, good quality and no environmental pollution. The wind speed in open sea areas is 30%-40% higher than that on land. Compared with onshore wind power, the energy benefit of wind energy resources of offshore wind power is 20% to 40% higher than that of onshore wind farms, and the scale of electric energy is increased by 50% to 70%. The offshore wind power also has the advantages of no occupation of land resources, stable operation, zero dust emission and the like, and is suitable for large-scale development. For example, 1.5 MW wind turbines are installed along the coast of Zhejiang Province, and can generate 1800-2000 hours of electricity on land and 2000-2300 hours at sea every year. The offshore wind power can generate 450000 KW·h more than onshore wind power in one year.

Due to the above-mentioned advantages, offshore wind power generation becomes a main trend of wind energy development. With the large-scale development of offshore wind farms, the single-unit large-capacity trend of deep-sea wind power has become inevitable, and is the latest cutting edge of global wind power development. As a key area of Chinese renewable energy development, offshore wind power will enter a new period of development during the 14th five-year plan period. Plans have been issued in many places successively, and the scale of offshore wind power is expected to increase significantly during the 14th five-year plan period.

The current research focus of offshore wind power lies in that offshore wind power technology has a trend of large-capacity single unit in deep sea, the weight and volume of the wind turbine are continuously increased, and the difficulty of marine transportation, hoisting, operation and maintenance is increased. For the purpose of reliable operation of the wind farm/wind turbine generator set at high efficiency and low cost, a proper method is needed. The existing motors are replaced with high-temperature superconducting (HTS) motors, so that the power density can be greatly increased, the volume and weight are significantly reduced, and the wind power cost is reduced. Therefore, the HTS motors have been widely popularized in the field of offshore wind power.

However, considering the current transfer characteristic of second-generation high-temperature superconducting strips, in order to maintain the constant current mode of the high-temperature superconducting magnet, the magnet is charged by an external power source through a copper current lead, and the external power source is a considerable heat source for a cooling system. The traditional current lead is bridged between the low-temperature Dewar flask and the room temperature, and a heat leakage source is formed at the current lead due to a huge temperature difference. In addition, due to the Joule heat generated by the joint resistance, flux creep and alternating-current loss during excitation operation, an additional heat source is formed, so that a serious burden is caused on refrigerating device, and the safe and stable operation of the device is affected.

Therefore, those skilled in the art have developed a variety of technical schemes to solve the above-mentioned problems, for example described in the Chinese Patent Application No. 201710034310.9, entitled "METHOD FOR APPLYING WIRELESS POWER TRANSMISSION AND MAGNETIC TRANSMISSION TO SUPERCONDUCTING MOTOR". A power frequency power supply is converted into a radio frequency power supply by the frequency converter for transmission through a transmitting coil. A receiving coil with the same resonance frequency as the transmitting coil induces an alternating current through coupling resonance, and supplies the obtained current to a stator coil through a rectifier inverter unit to generate a rotating magnetic field. A rotor winding generates an induced current to form a magnetic field, interacts with a stator rotating magnetic field to generate rotation, and the torque is transmitted to an external load through a magnetic transmission device. The wireless power transmission technology is used to transmit electric power to the stator coil. A rotating magnetic field is generated in the air gap of the motor. The output torque of the rotor is transferred to the load through the magnetic transmission device, so that the heat leakage load brought by a current feeder and a mechanical transmission shaft can be effectively avoided, the refrigerating requirement for the refrigerator is reduced, the cost of the refrigerating system and the operating cost of the motor are reduced, and the structure of the motor system is optimized, so that the whole machine is small in size and compact in structure.

However, in the scheme, the power frequency power supply is converted into the radio frequency power supply by the frequency converter. At the same time, the alternating current is rectified by the rectifier inverter unit, and complex electromagnetic devices and control units are needed, so that the equipment is complex in structure is poor in maintainability. In addition, a large amount of Joule heat can be generated after long-term use of a switching circuit, which is conducive to long-term reliable operation.

For another example, in the Chinese Patent Application No. 202310735554.5, entitled "WIRELESS EXCITATION SYSTEM FOR SUPERCONDUCTING MOTOR", the wireless excitation system includes a transmitting coil, a receiving coil and a superconducting rectifier. The transmitting coil is in a room-temperature environment and remains stationary. The receiving coil, the superconducting rectifier and a superconducting excitation winding in the superconducting motor are in a low-temperature environment and rotate synchronously. The transmitting coil and the receiving coil are coupled through a magnetic field. The superconducting rectifier and the superconducting excitation winding are arranged at both ends of the receiving coil in parallel. During working, the transmitting coil provides a driving current for the system through an external alternating current source, so that the transmitting coil transmits magnetic field energy to the outside with the magnetic effect of the current, and an induced alternating current is generated in the receiving coil. The superconducting rectifier is configured for rectifying the induced alternating current, so that direct-current voltage is generated at both ends of the superconducting excitation winding for excitation. According to the present disclosure, current leads and rotating components configured for excitation on the traditional superconducting motor can be effectively eliminated, so that the efficiency of the superconducting motor is improved, and the volume, weight and cost are reduced.

However, in this scheme, the superconducting rectifier is parallel to the excitation winding, and the joint winding generates a heat load. The heat load is not conducive to the maintenance of the low-temperature environment. Moreover, the superconducting rectifier is configured for rectifying the induced alternating current of the excitation winding, and heat loss is generated during operation. More cooling capacity is required to maintain the stability of the low-temperature environment, and the cooling requirement is large.

Therefore, there is an urgent need for a brand-new scheme to solve the above-mentioned problems, so that the composition of the device is simplified, and the heat loss is reduced.

SUMMARY

The present disclosure aims to provide a wireless power supply system for a superconducting offshore wind turbine so as to solve the problems in the prior art, so that the composition of the device is simplified, and the thermal loss is reduced.

In order to achieve the purpose, the present disclosure provides the following scheme.

A wireless power supply system for a superconducting offshore wind turbine includes a shell, and a vacuum Dewar flask, a superconducting motor and a rotary flux-pump wireless power supply device which are arranged inside the shell.

A refrigerating apparatus is rotatably arranged inside the vacuum Dewar flask, and a power source for rotating the refrigerating apparatus is the offshore wind turbine.

The superconducting motor includes an armature winding fixed on an inner wall of the shell and excitation windings uniformly arranged on an outer periphery of the refrigerating apparatus.

The rotary flux-pump wireless power supply device includes an inner rotor and an outer rotor which are arranged opposite to each other. The inner rotor is arranged inside the vacuum Dewar flask, the outer rotor is arranged outside the vacuum Dewar flask, and the inner rotor and the outer rotor coaxially rotate with the excitation windings.

High-temperature superconducting stator strips are provided at an outer periphery of the inner rotor and electrically connected to the excitation windings in one-to-one correspondence; permanent magnets are provided on one side, facing the inner rotor, of the outer rotor and in one-to-one correspondence with the high-temperature superconducting stator strips.

The outer rotor and the inner rotor rotate differentially, the permanent magnets induce a direct-current output voltage on the high-temperature superconducting stator strips, to input a direct current to the excitation windings, so as to form a magnetic field and induce an output voltage at the armature winding of the superconducting motor.

In some embodiments, the excitation winding is a non-insulation twin-disk coil, and is formed by winding second-generation high-temperature superconducting strips YBCO (Yttrium Barium Copper Oxide) and stainless steel on an epoxy resin framework.

In some embodiments, the high-temperature superconducting stator strips on the inner rotor are independently wound in parallel.

In some embodiments, the high-temperature superconducting stator strips are welded and connected to the excitation windings through lead tin-soldering sheet soldered joints.

In some embodiments, an annular magnet yoke of the inner rotor is made of aluminum oxide.

In some embodiments, the part, located between the inner rotor and the outer rotor, of the vacuum Dewar flask is made of a G10 composite material.

In some embodiments, the refrigerating apparatus is fixedly connected to the offshore wind turbine by a first rotating shaft extending through the vacuum Dewar flask and the shell.

In some embodiments, support members for mounting the refrigerating apparatus are provided inside the vacuum Dewar flask, and the refrigerating apparatus is rotatably connected to the support members by bearings.

In some embodiments, the wireless power supply system for a superconducting offshore wind turbine also includes a negative feedback transmission device for monitoring a rotational speed of the first rotating shaft of the offshore wind turbine and adjusting a rotational speed of the outer rotor according to the rotational speed of the first rotating shaft of the wind turbine.

In some embodiments, the negative feedback transmission device includes a monitoring unit, a drive motor electrically connected to the monitoring unit, a driving gear fixedly arranged at an output end of the drive motor, and a driven gear fixedly connected to the outer rotor.

Compared with the prior art, the present disclosure has the following technical effects.

Firstly, the superconducting flux pump technology is introduced in the present disclosure, and non-contact rotary excitation is adopted. The flux is injected into the closed coil through non-electrical connection to compensate the current attenuation of the high-temperature superconducting magnets, without a traditional current lead. In this way, the leakage heat source formed by the bridge connection of the current lead between the room-temperature environment and the low-temperature environment and the joule heat of the current lead generated during the excitation operation are eliminated, the refrigerating requirement is reduced, and the energy utilization efficiency of the system is improved, and the slip ring structure is omitted through the modular design, so that the mechanical wear is optimized, and the complex maintenance of the system is reduced.

Secondly, the non-contact rotary excitation induces a direct-current output in the high-temperature superconducting stator strips, which is not required for rectification by a separate rectifier. The structure of the superconducting wind turbine device is simpler, and there is no additional energy consumption, so that the energy utilization rate is effectively improved.

Thirdly, the electrical parameters output by the rotary flux-pump wireless power supply device is a direct-current output, so that the slip ring and an electric brush in the traditional wind turbine are omitted, the structure of the rotors of the superconducting wind turbine is simplified, the mechanical loss of the slip ring and the electric brush is eliminated, and overhaul and maintenance are facilitated.

Fourthly, in the inner rotor of the rotary flux-pump wireless power supply device, each high-temperature superconducting stator strip is connected separately with the excitation winding of the superconducting motor to form a modular design. When one of the coils fails, the other superconducting coils can still operate reliably.

Fifthly, according to the rotary flux-pump wireless power supply device, the rotary exciting outer rotor is transferred from the low-temperature Dewar flask into a room-temperature environment, so that frictional heat and conduction heat of the mechanical transmission shaft are effectively avoided, the refrigerating requirement for the refrigerator is reduced, and the refrigeration cost and operation and maintenance cost are reduced.

Sixthly, according to the rotary flux-pump wireless power supply device, the Dewar flask located between the inner rotor and the outer rotor is made of a G10 composite material. The G10 material has excellent insulating performance and high temperature resistance under the same thickness as conventional insulating materials. Therefore, the thickness can be reduced while maintaining the same electrical performance, so that the air gap space occupied between the inner rotor and the outer rotor is reduced, and the air gap between the inner rotor and the outer rotor can be compressed. The use of G10 composite material can effectively reduce the gap between the permanent magnets and the high-temperature superconducting stator strips, so that the magnetic field intensity on the high-temperature superconducting stator strips is increased, and the exciting current in the high-temperature superconducting twin-disk coil is increased.

Seventhly, due to the offshore wind power is intermittent and fluctuating, the speed of the rotating shaft of the superconducting wind turbine continuously changes. The negative feedback transmission device is provided to monitor the rotational speed of the offshore wind turbine, adjust the rotational speed of the outer rotor, and maintain the rotational speed difference between the permanent magnets and the high-temperature superconducting stator strips. In this way, the traveling wave magnetic field on the high-temperature superconducting stator strips is kept stable, so that the exciting current input of the superconducting wind turbine is constant.

BRIEF DESCRIPTION OF THE DRAWINGS

To more clearly illustrate the present embodiment of the present disclosure or the technical scheme in the prior art, the following briefly introduces the attached figures to be used in the present embodiment. Apparently, the attached figures in the following description show merely some embodiments of the present disclosure, and those skilled in the art may still derive other drawings from these attached figures without creative efforts.

Figure 1:
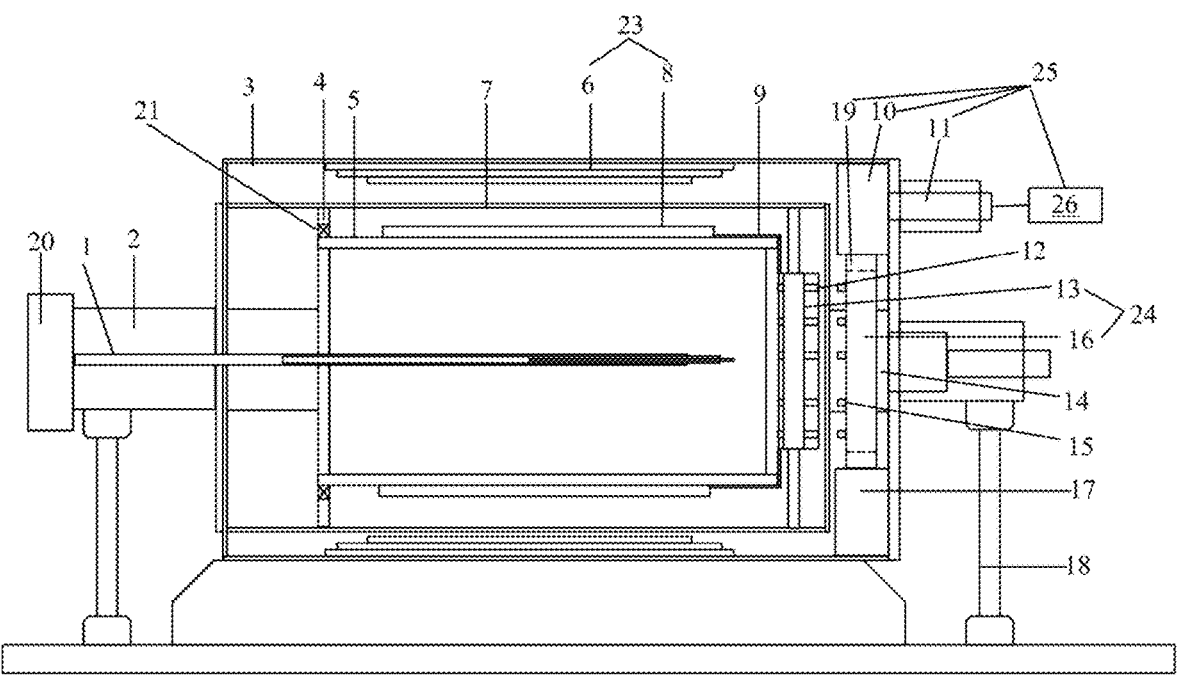
FIG. 1 is a structural schematic diagram of a wireless power supply system for a superconducting offshore wind turbine disclosed in the present disclosure.

Reference signs: 1, liquid nitrogen inlet pipe; 2, first rotating shaft; 3, shell; 4, support member; 5, refrigerating apparatus; 6, armature winding; 7, vacuum Dewar flask; 8, excitation winding; lead tin-soldering sheet soldered joint;

10, driving gear; 11, drive motor; 12, high-temperature superconducting stator strip; 13, inner rotor; 14, second rotating shaft; 15, permanent magnet; 16, outer rotor; 17, support gear; 18, support; and 19, driven gear, 20 superconducting offshore wind turbine, 21 bearing, 22 annular magnet yoke, 23 superconducting motor, 24 rotary flux-pump wireless power supply device, 25 negative feedback transmission, and 26 monitoring unit.

DETAILED DESCRIPTION OF THE EMBODIMENTS

The following clearly and completely describes the technical schemes in the embodiments of the present disclosure with reference to the attached figures in the embodiments of the present disclosure. Other advantages and effects of the present disclosure can be easily understood by those skilled in the art from what is disclosed in this specification. Apparently, the embodiments in the following description are merely a part rather than all of the embodiments of the present disclosure. Based on the embodiment in the present disclosure, all other embodiments acquired by the ordinary technical staff in the art without contributing creative labor belong to the scope protected by the present disclosure.

The structures, proportions, sizes and the like depicted in the specification are only configured for being matched with the contents disclosed in the specification for people familiar with the technology to understand and read, and are not configured for limiting the implementation limiting conditions of the present disclosure, so that the practical significance, modification of any structure, change of proportional relation or adjustment of the size in the technology are avoided, and without affecting the effects and achievable objectives of the present disclosure, it should still fall within the scope of what the technical content disclosed herein can cover. In the description of the present disclosure, it needs to be illustrated that the indicative direction or position relations of the terms such as "longitudinal", "transverse", "upper", "lower", "front", "rear", "left", "right", "vertical", "horizontal", "top", "bottom", "inside" and "outside" are direction or position relations illustrated based on the attached figures, just for facilitating the description of the present disclosure, but not for indicating or hinting that the indicated device or element must be in a specific direction and is constructed and operated in the specific direction, the terms cannot be understood as the restriction of the present disclosure. Moreover, the terms such as "first", "second" and "third" are just used for distinguishing the description, but cannot be understood to indicate or hint relative importance. Therefore, a feature limited by "first" or "second" may explicitly or implicitly include one or more features. In the descriptions of the embodiments of the present invention, "plurality" means at least two, unless otherwise specified.

It should also be noted that in the embodiments of this application, the same constituent part or the same component is denoted by the same attached figure reference signs.

The superconducting motor (HTS motor) refers to a motor with windings by winding wires made of superconducting materials and capable of carrying a high-density current under a strong magnetic field. Taking advantage of the zero resistance of superconducting materials in low-temperature environments, stronger currents can be passed through wires of the same specification to generate high-strength magnetic fields, so that the size of the motor is significantly reduced, the power density is high, and the efficiency is high.

So far, the superconducting motor mainly focuses on the superconducting synchronous generator and the superconducting monopole motor. The use of the superconducting strip in winding of the stator of the motor has very large in alternating-current loss at power frequency, so the superconducting synchronous generator usually uses superconducting coils as excitation windings of the rotor, and the stator winding is still a conventional copper winding.

At present, there are three main types of superconducting materials that have achieved large-scaled commercialization, namely low-temperature superconducting materials (the superconducting critical temperature is below 25k), first-generation high-temperature superconducting materials (Bi-series), and second-generation high-temperature superconducting materials (Y-series). The commercialization of the low-temperature superconducting materials is very mature, and the price of strips is relatively low. The low-temperature superconducting materials are mainly applied in the low magnetic field of 15T and below. The high-temperature superconducting materials are high in the upper limit of a critical magnetic field and high in current-carrying capacity, the volume of superconducting device can be reduced, and the potential for large-scale application is relatively high. Wherein, a large part of raw materials for manufacturing most strips of the first-generation high-temperature superconducting materials BSCCO (Bismuth Strontium Calcium Copper Oxide) include silver, so the cost is difficult to reduce, and the commercial application is limited. However, raw materials of a strip base band and a cushion protection layer of the second-generation high-temperature superconducting materials YBCO (Yttrium Barium Copper Oxide) are stainless steel and copper mainly, so the cost reduction space is large. Scale effect is brought along with the technical progress of multi-layer film preparation and the mass manufacturing of kilometer-long strips. The price of the second-generation high-temperature superconducting strips is continuously reduced, the product yield is improved, and the industrial application of high-temperature superconducting technology is promoted to be accelerated further.

The high-temperature superconducting magnet has the performance advantages of high magnetic field intensity, high operational stability, quench risk, low refrigeration cost and small size. The high-temperature superconducting magnet is high in commercial application potential and wide in applied range.

Firstly, the high-temperature superconducting magnet is high in critical field upper limit, and the highest field strength can reach 45 T at present. The high-temperature superconducting magnet can be applied in the fields of high-field magnetic field requirements such as NMR (Nuclear Magnetic Resonance spectrometers) with the field strength of more than 15 T and compact controllable nuclear fusion.

Secondly, the high-temperature superconducting magnet is high in operational stability and low in quench risk, and can be treated without insulation, so that the robustness of the superconducting magnet is greatly improved. Usually, the critical temperature of the high-temperature superconducting material is above 77 k in the liquid helium temperature range. Compared with the low-temperature superconducting material, the high-temperature superconducting material has the characteristics of wide temperature transformation range, relatively large working temperature range, slow quench propagation speed and large minimum quench energy. From the perspective of heat tolerance, the gasification latent heat of liquid helium is 2.6 kJ/L, and the gasification latent heat of liquid nitrogen is 160 kJ/L. The high-temperature superconductor can withstand much greater heat accumulation than the low-temperature superconductor. At the same time, the alloy base band material of the high-temperature superconducting strip can prevent magnetic flux movement, so that the released heat is reduced, and the risk of quench phenomena is lower. The stability of the high-temperature superconducting magnet is relatively high, and the frictional heat generated by mechanical disturbance is not enough to enable the high-temperature superconducting magnet to quench. Therefore, during winding, curing can be carried out without epoxy resin. At the same time, treatment can be carried out in a non-insulation manner. Due to the non-insulation high-temperature superconducting magnet, the base band and the protection layer of the strip are equivalent to the inter-turn "electrical insulation" materials of the superconducting layer. Once quenching occurs, the resistance of the superconducting layer can quickly climb to an order of magnitude equivalent to these metal materials. Part of current can be automatically divided through the inter-turn contact to bypass quench points, so that the further development of quenching is effectively suppressed. Compared with traditional insulated coils, the robustness and overall engineering current density of the superconducting magnet are greatly improved. Since non-insulation coils are self-stable, active protection systems such as heaters are not required generally.

Thirdly, the refrigeration cost of the high-temperature superconducting magnet is relatively low. Compared with a dry low-temperature superconducting magnet that requires multiple secondary refrigerators for refrigeration, the high-temperature superconducting magnet only needs a single-stage refrigerator for magnet cooling, and the volume of the magnet system is relatively small.

However, in order to maintain the constant current mode of the high-temperature superconducting magnet, the magnet is charged by an external power source through a copper current lead, and the external power source is a considerable heat source for a cooling system. The traditional current lead is bridged between the low-temperature Dewar flask and the room temperature, and a leakage heat source is formed at the current lead due to a huge temperature difference. In addition, due to the Joule heat generated by the joint resistance, flux creep and alternating-current loss during excitation operation, an additional heat source is formed, so that a serious burden is caused on the refrigerating device, and the safe and stable operation of the equipment is affected.

The present disclosure aims to provide a wireless power supply system for a superconducting offshore wind turbine so as to solve the problems in the prior art, so that the composition of the device is simplified, and the thermal loss is reduced.

To make the foregoing objective, features and advantages of the present disclosure clearer and more comprehensible, the present disclosure is further described in detail below with reference to the attached figures and specific embodiments.

Referring to FIG. 1, the embodiment provides a wireless power supply system for a superconducting offshore wind turbine 20, including a shell 3, a vacuum Dewar flask 7, a superconducting motor 23 and a rotary flux-pump wireless power supply device 24 which are arranged inside the shell 3. A refrigerating apparatus 5 is rotatably arranged inside the vacuum Dewar flask 7, and a power source for rotating the refrigerating apparatus 5 is an offshore wind turbine 20. The superconducting motor 23 includes an armature winding 6 fixed on an inner wall of the shell 3 and excitation windings 8 uniformly arranged on the outer periphery of the refrigerating apparatus 5. The rotary flux-pump wireless power supply device 24 includes an inner rotor 13 and an outer rotor 16 which are arranged opposite to each other on the inner and outer sides of the vacuum Dewar flask 7, and the inner rotor 13 and the outer rotor 16 coaxially rotate with the excitation windings 8. High-temperature superconducting stator strips 12 are provided at an outer periphery of the inner rotor 13 and electrically connected with the excitation windings 8 in one-to-one correspondence. Permanent magnets 15 are provided on one side, facing the inner rotor 13, of the outer rotor 16 and in one-to-one correspondence with the high-temperature superconducting stator strips 12. The outer rotor 16 and the inner rotor 13 rotate differentially, the permanent magnets 15 induce a direct-current output voltage on the high-temperature superconducting stator strips 12, to input a direct current to the excitation windings 8, so as to form a magnetic field, and induce an output voltage at the armature winding 6 of the superconducting motor.

Specifically, the vacuum Dewar flask 7 is made of a non-magnetic material, has the exterior using laminated silicon steel as a magnetic shield layer for protecting electrical equipment, and an interior in which a refrigerating apparatus 5 is provided for providing a low-temperature environment. One end of the refrigerating apparatus 5 is fixedly connected to a first rotating shaft 2 of the offshore wind turbine, and rotates coaxially with the offshore wind turbine under the driving of the first rotating shaft 2 passing through the shell 3 and the vacuum Dewar flask 7. The refrigerating apparatus 5 is partially made of a stainless steel material, and liquid nitrogen is introduced through a liquid nitrogen inlet pipe 1 passing through the first rotating shaft 2 for refrigeration to provide cooling capacity for a vacuum low-temperature environment inside the vacuum Dewar flask 7, so that the excitation windings 8 and the high-temperature superconducting strips on the inner rotor 13 maintain a superconducting state and operate safely and reliably.

Support members 4 are provided inside the vacuum Dewar flask 7 for mounting the refrigerating apparatus 5. The support members 4 are respectively mounted at both ends of the refrigerating apparatus 5. The outer periphery of one end, close to the first rotating shaft 2, of the refrigerating apparatus 5 is provided with a bearing, and is rotatably connected with the support member 4 at the end through the bearing. The inner rotor 13 of the rotary flux-pump wireless power supply device is mounted at one end, away from the first rotating shaft 2, of the refrigerating apparatus 5. The inner rotor 13 is provided with a mounting part for mounting the bearing, and is rotatably connected with the other support member 4 at the end of the refrigerating apparatus 5 through the bearing.

In order to ensure the stability of the refrigerating apparatus 5 which rotates at a high speed in the working state, the number of support members 4 is not limited to two, but a plurality of support members may also be uniformly arranged along the axial direction of the refrigerating apparatus 5. The refrigerating apparatus 5 is rotatably connected to the support members 4 respectively through a plurality of bearings 21 respectively.

The excitation winding 8 of the superconducting motor is non-insulation twin-disk coil, and is formed by winding second-generation high-temperature superconducting strips YBCO and stainless steel on an epoxy resin framework. Multiple exciting coils are uniformly arranged on the outer periphery of the refrigerating apparatus 5, and are driven by the refrigerating apparatus 5 to coaxially rotate with the offshore wind turbine. The excitation winding 8 of the superconducting motor is not limited to the twin-disk coil in structure, but adopts any other structural form that can achieve the same function.

An annular magnet yoke 22 of the inner rotor 13 of the rotary flux-pump wireless power supply device is made of aluminum oxide, and the magnetic path of each high-temperature superconducting stator strip 12 cannot be changed. The inner rotor 13 is fixed at the other end, away from the first rotating shaft 2, of the refrigerating apparatus 5, and is located on the inside of the vacuum Dewar flask 7 in a low-temperature refrigeration environment, and is also driven by the refrigerating apparatus 5 to coaxially rotate with the offshore wind turbine. A plurality of high-temperature superconducting stator strips 12 are uniformly wound on the annular magnet yoke of the inner rotor 13 in parallel to form the excitation coil of the inner rotor. In the embodiment, 12 YBCO stator strips with the width of 10 mm are specifically arranged. Each high-temperature superconducting stator strip 12 is welded and connected to the excitation winding 8 of the superconducting motor through a lead tin-soldering sheet soldered joint 9.

The high-temperature superconducting stator strips 12 and the excitation windings 8 are connected in series, and the multiple high-temperature superconducting stator strips 12 and excitation windings 8 do not interfere with each other to form a modular design. When one of coils fails, other superconducting coils can still operate reliably.

The outer rotor 16 of the rotary flux-pump wireless power supply device is made of epoxy resin and is located on the outer side of the vacuum Dewar 7 flask at room temperature. The outer rotor 16 is supported by a support 18 and a second rotating shaft 14 arranged outside the vacuum Dewar flask 7, and is driven by a drive motor 11 and a transmission gear to coaxially rotate with the inner rotor 13. Permanent magnets 15 in one-to-one correspondence with the high-temperature superconducting stator strips 12 are uniformly distributed on one side close to the inner rotor 13. The permanent magnets 15 in the embodiment includes 12 cylindrical permanent magnets 15 corresponding to 12 YBCO stator strips uniformly wound on the annular magnet yoke of the inner rotor 13. The permanent magnets 15 are 5 mm in radius, N52 in model, better in magnetic field distribution and stronger in magnetic field intensity, and arranged on the outer rotor 16 of the rotary flux-pump wireless power supply device.

It should be noted that the diameter of the permanent magnets 15 are adjusted to be half of the width of the stator strip of the wireless power supply device, but is not limited to half of the width. The permanent magnets 15 are not limited to N52 cylindrical permanent magnets, but any other structural model that can achieve the same function can also be selected.

Figure 2:
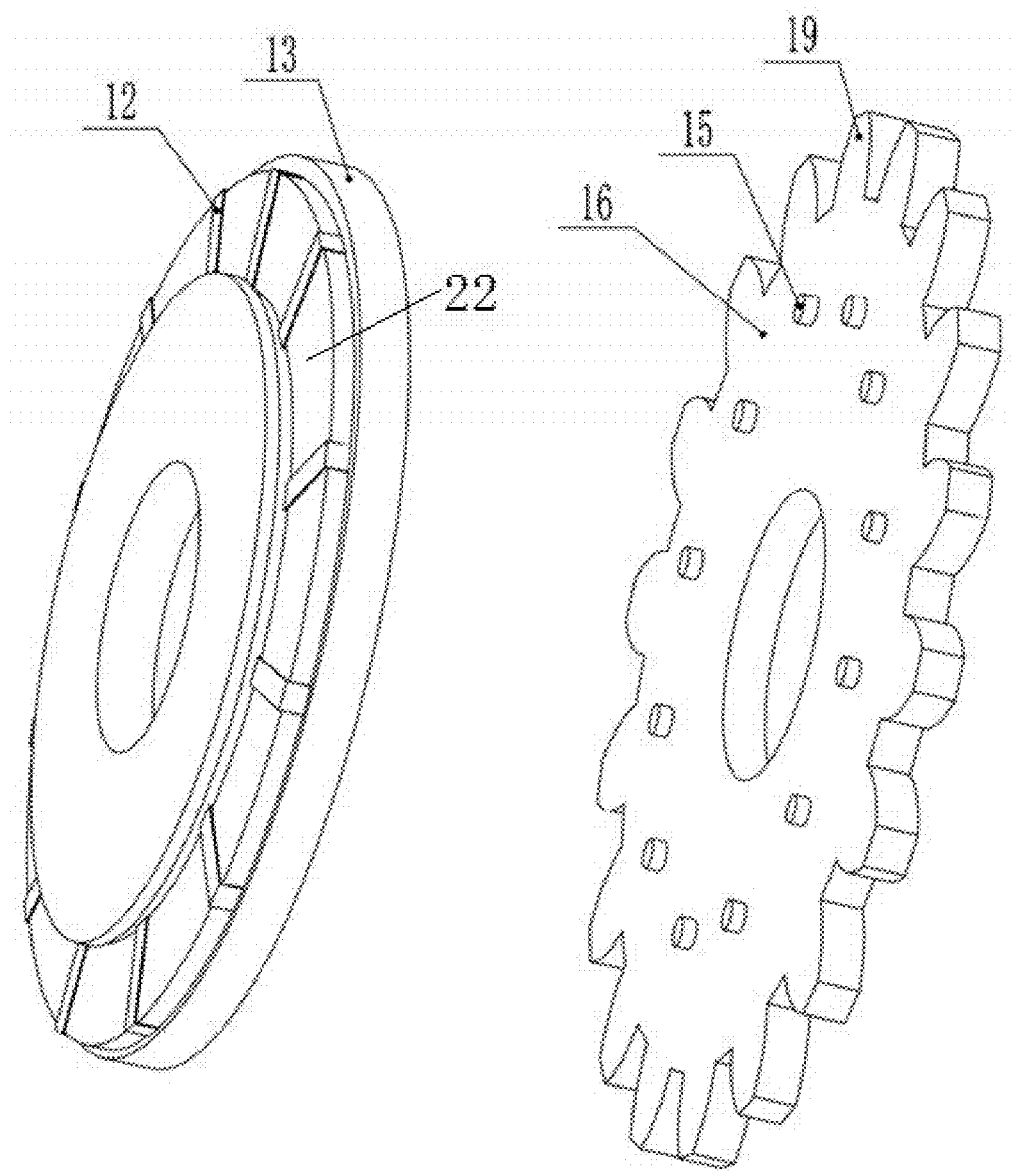
FIG. 2 is a structural schematic diagram of an inner rotor and an outer rotor in FIG. 1.

As a preferred scheme of the embodiment, as shown in FIG. 1 and FIG. 2, the side surfaces of the inner rotor 13 and the outer rotor 16 are arranged oppositely, the spacing between the uniformly wound high-temperature superconducting stator strips 12 on the annular magnet yoke of the inner rotor 13 is the same as the spacing between the permanent magnets 15 arranged on the outer rotor 16, and the radii from the permanent magnets 15 to the center of the outer rotor 16 are the same.

In the scheme, the mounting part for mounting the bearing is arranged on the outer periphery of the annular magnet yoke of the inner rotor 13. The high-temperature superconducting stator strips 12 are wound by passing through a hole of the mounting part. The inner rotor 13 is rotatably connected to the support members 4 by the bearing. The high-temperature superconducting stator strips 12 uniformly wound on the annular magnet yoke of the inner rotor 13 are located on the outer side surface, facing one side of the outer rotor 16, of the inner rotor 13 to be opposite to side end faces of the permanent magnets 15 arranged on the outer rotor 16. The magnetization directions of the permanent magnets 15 are coaxial, and the permanent magnets 15 are copolar towards the high-temperature superconducting stator strips 12 on the inner rotor 13. At this time, a part, located between the inner rotor 13 and the outer rotor 16, of the vacuum Dewar flask 7 is of a planar structure, and the side surface of the inner rotor 13 opposite to the outer rotor 16 and the side surface of the outer rotor 16 opposite to the inner rotor 13 are respectively located on the inner and outer sides of the planar structure.

Figure 3:
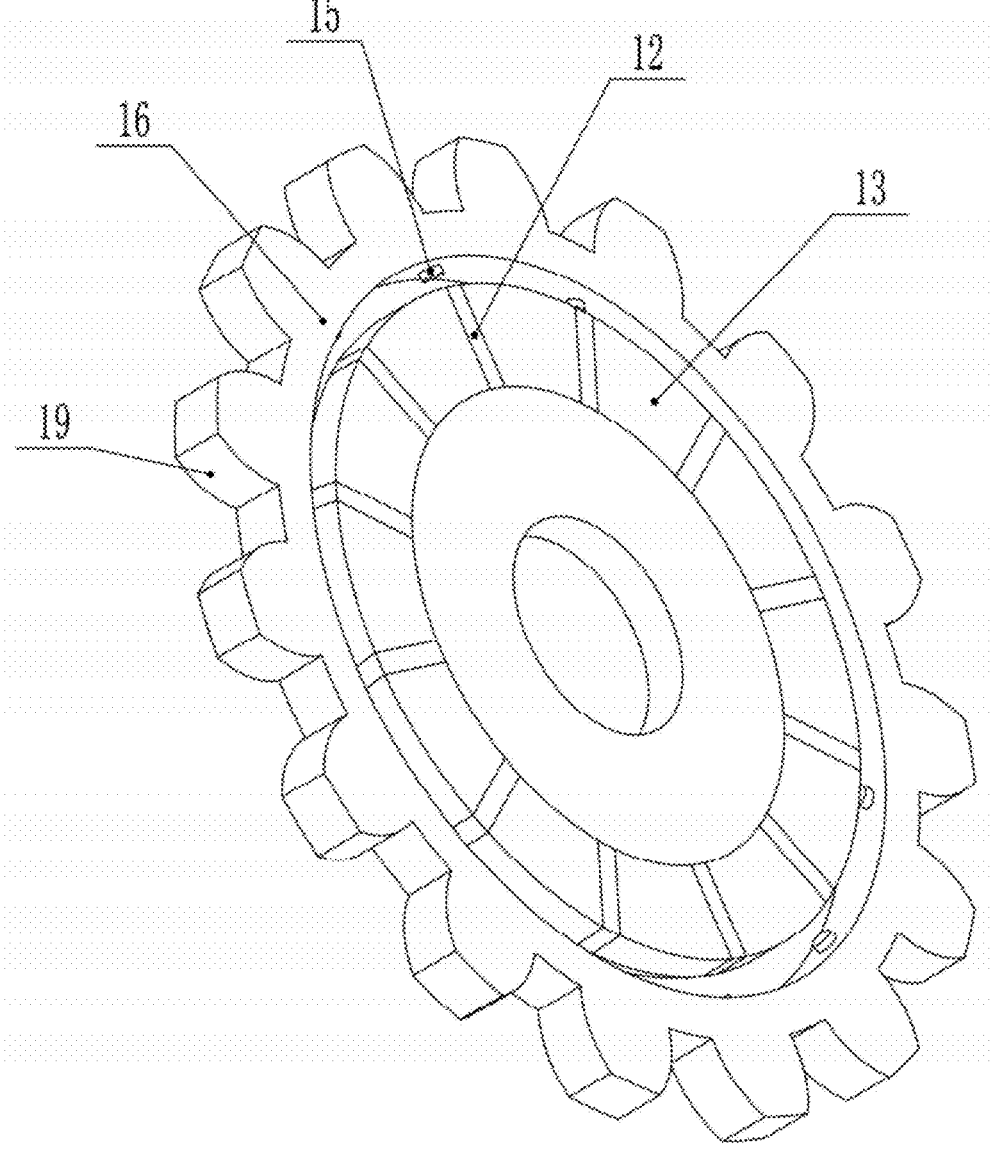
FIG. 3 is another structural schematic diagram of an inner rotor and an outer rotor in FIG. 1.

As a preferred scheme of the embodiment, as shown in FIG. 3, the inner rotor 13 and the outer rotor 16 are in an internal and external coupling form. The spacing between the uniformly wound high-temperature superconducting stator strips 12 on the annular magnet yoke of the inner rotor 13 is the same as the spacing between the permanent magnets 15 arranged on the outer rotor 16. The radii from the permanent magnets 15 to the center of the outer rotor 16 are the same.

In the scheme, a part, opposite to the inner rotor 13, of the outer rotor 16 is of an annular structure. The inner rotor 13 is located in an inner ring of the outer rotor 16. The permanent magnets 15 are uniformly arranged on an inner circumferential surface of the ring in a radial shape. The magnetization direction of the permanent magnets 15 directs the direction of the rotating shaft. The parts, located on the outer circumference surface of the inner rotor 13, of the high-temperature superconducting stator strips 12 uniformly wound on the annular magnet yoke of the inner rotor 13 are opposite to side end faces, facing the inner rotor 13, of the permanent magnets 15. One side, away from the outer rotor 16, of the inner rotor 13 is provided with the mounting part for mounting the bearing, and the inner rotor 13 is rotatably connected to the support members 4 through the bearings. At this time, a part, located between the inner rotor 13 and the outer rotor 16, of the vacuum Dewar flask 7 is of a convex structure. The convex structure stretches into the inner ring of the outer rotor 16. The opposite outer circumference surfaces of the inner rotor 13 and the outer rotor 16 and the opposite inner circumference surfaces of the outer rotor 16 and the inner rotor 13 are respectively located on the inner and outer sides of the convex structure in the radial direction.

It should be noted that the number of the high-temperature superconducting stator strips 12 uniformly wound on the annular magnet yoke of the inner rotor 13 in parallel and the number of the permanent magnets 15 arranged on the outer rotor 16 depend on the number of excitation windings 8 of the superconducting motor, and are not limited to the number of 12 exemplified in the embodiment. At the same time, the height and number of the permanent magnets are selected according to comprehensive consideration of factors such as the rotor magnetic field of the wireless power supply device and the gap width between the rotor and the stator.

The part, located between the inner rotor 13 and the outer rotor 16, of the vacuum Dewar flask 7 is made of a G10 composite material. The G10 material has excellent insulating performance under the same thickness as conventional insulating materials. Therefore, the thickness can be reduced while maintaining the same electrical performance, so that the air gap space occupied between the inner rotor 13 and the outer rotor 16 is reduced, and the air gap between the inner rotor 13 and the outer rotor 16 can be compressed. Therefore, the use of G10 composite material can effectively reduce the gap between the permanent magnets 15 and the high-temperature superconducting stator strips 12, so that the magnetic field intensity on the high-temperature superconducting stator strips 12 is increased, and the exciting current in the exciting coil of the inner rotor is increased.

With regard to the G10 composite material, the G10 composite material is a composite material composed of glass fiber and epoxy resin, and is widely applied in aviation, aerospace, electronics, automobile, medical equipment and other fields. The G10 composite material has excellent mechanical properties, electrical insulation properties and chemical corrosion resistance, and is an ideal engineering material.

Firstly, the G10 composite has excellent mechanical properties. Due to the structure of a fiber-reinforced resin matrix, the G10 composite material is high in strength and rigidity, and can withstand high-strength stress environments. Compared with metal materials, the G10 composite material is relatively low in weight, so that the G10 composite material is more flexible and convenient in reengineering design.

Secondly, the G10 composite material is excellent in electrical insulating properties. Because the G10 composite material is composed of epoxy resin with excellent insulation performance, the G10 composite material is good in insulation performance, so that current and voltage can be effectively isolated, and faults and accidents of electrical equipment are reduced. Therefore, the G10 composite material is widely applied in insulating materials, circuit boards and electrical insulating components in the electronic field.

In addition, the G10) composite material is also good in chemical corrosion resistance. Due to the corrosion resistance of glass fiber and the chemical stability of epoxy resin, the G10 composite material can maintain the stability performance in harsh environments such as acids, alkalis and solvents. Therefore, the G10 composite material is widely applied in chemical, marine and medical devices and other fields.

Moreover, the G10 composite material also has the characteristic of good processability. Parts of various shapes and sizes can be formed through molding, extrusion, pressing and other processes, so that the G10 composite material adapts to different engineering requirements. Due to the specific characteristic of material composition, the G10 composite material is also relatively high in dimensional stability and not prone to deform and expand, so that the accuracy and stability of products can be ensured.

In conclusion, the G10 composite material is high in strength and rigidity, so that the overall strength requirement of the refrigerating apparatus 5 under the high-speed rotation of the rotating shaft of the offshore wind turbine can be ensured. The G10 composite material is not prone to deform and expand, so that the overall stability of the refrigerating apparatus 5 can be ensured in an ultra-low-temperature environment generated by liquid nitrogen. The insulation performance far superior to that of the uniform insulating material can reduce the thickness while maintaining the same electrical performance, the magnetic flux gap between the inner rotor 13 and the outer rotor 16 is reduced, the magnetic field intensity on the high-temperature superconducting stator strips 12 is enhanced, and the exciting current of the excitation winding 8 of the superconducting motor is increased, so that the charging efficiency of the excitation winding 8 of the superconducting motor is greatly improved.

In the embodiment, only the part, located between the inner rotor 13 and the outer rotor 16, of the vacuum Dewar flask 7 is made of the G10 composite material, and the other parts are made of stainless steel material. It should be noted that the proportion of the G10 composite material can be reasonably distributed according to needs, not limited to the parts between the inner rotor 13 and the outer rotor 16, such as the end face, close to one side of the inner rotor 13 and the outer rotor 16, of the vacuum Dewar flask 7, and an axial side wall of the vacuum Dewar flask 7, or all the side walls of the vacuum Dewar flask 7. It should be noted that the material of the part, located between the inner rotor 13 and the outer rotor 16, of the vacuum Dewar flask 7 is not limited to G10, but any other material that can achieve the same function may be selected. The working principle of the embodiment is as follows.

The superconducting flux pump technology is introduced in the embodiment. Flux is injected into a closed coil through non-electrical connection to compensate the current attenuation of the high-temperature superconducting magnet, without a current lead. In this way, the heat source of the current lead is eliminated, and a direct current is continuously provided for the excitation winding 8, so that the traditional slip ring structure in the motor is omitted, the mechanical friction heat loss of the equipment is eliminated, the heat conduction between the room temperature and the low-temperature environment is blocked, and the refrigerating requirement can be effectively reduced. At the same time, the slip ring structure is omitted through the modular design, the mechanical wear is optimized, and the complex maintenance of the equipment is reduced.

The rotary flux-pump wireless power supply device directly provides the direct current for the excitation winding 8, which is not required to convert the power frequency power supply into a radio frequency power supply by a frequency converter, and to rectify an alternating current by a rectifier inverter unit, therefore, the equipment composition is simplified without complex electromagnetic devices and control units, so that the equipment is simple in structure and high in maintainability. In addition, a large amount of Joule heat cannot be generated during the working of the superconducting flux pump like the conversion circuit, which is conducive to long-term reliable operation.

In the embodiment, the inner rotor 13, wound with the high-temperature superconducting stator strips 12, of the rotary flux-pump wireless power supply device is arranged inside the low-temperature vacuum Dewar flask 7, and the interior of the vacuum dewar 7 keeps cool by the refrigerating apparatus 5, so that the high-temperature superconducting stator strips 12 are kept in a superconducting state. At the same time, the outer rotor 16 of the rotary flux-pump wireless power supply device is moved out of the low-temperature environment and placed in the room-temperature environment outside the vacuum Dewar flask 7. The outer rotor 16 is supported by the support 18 and the second rotating shaft 14 arranged outside the vacuum Dewar flask 7, so that an indirect contact manner is formed between the inner rotor 13 and the outer rotor 16. The heat conduction caused by the rotating shaft of the traditional flux pump in the low-temperature environment is eliminated, the mechanical friction between the mechanical transmission shaft and the low-temperature vacuum Dewar flask 7 is avoided, the dynamic sealing property in the low-temperature environment is improved, and the structure of the superconducting offshore wind turbine is further simplified.

In addition, considering the characteristics, such as randomness, intermittence and fluctuation, of offshore wind power, the change of wind speed directly leads to the instability of the rotational speed of the wind turbine and leads to the change of the output power of a high-temperature superconducting flux pump wireless power supply device, so that the output power quality of the superconducting wind turbine is affected by the exciting input current fluctuation of the superconducting wind turbine. The influence of wind farm power fluctuation on electric power systems is embodied in the following aspects.

Firstly, the influence of voltage stability: the stability of network voltage is affected by wind farm power fluctuation, and high power fluctuation can affect the network voltage, even resulting in instability of the network voltage to trigger various power accidents.

Secondly, the influence of frequency stabilization: the wind farm power fluctuation can generate direct influence on the stabilization of power network frequency, and the influence is higher especially in small network systems.

Thirdly, the influence of network safety: the wind farm power fluctuation causes the increase of operation times of a circuit breaker and a protection device, and the electric pressure and mechanical stress of the equipment can be increased, so that the safety of the electric system is affected.

Due to the uncertainty and uncontrollability of wind power, the power supply of the grid-connected wind turbine generator cannot meet the requirements of stability, continuity and adjustability, and the continuous change of output power is prone to have an impact on the power grid. Due to the unpredictability of wind power, scheduling operation personnel cannot make an effective power generation plan for wind power generation, resulting in an increase in system backup power supply, peak shaving capacity and system operating cost, and a series of consequences that threaten the safe and stable operation of the system.

In order to solve the problem of input current fluctuation of the excitation winding of the superconducting wind turbine, a feedback transmission device is introduced into the rotary flux-pump wireless power supply device in the embodiment. By monitoring the rotational speed of the offshore wind turbine, the rotational speed of the outer rotor 16 is adjusted, so that the rotational speed difference between the outer rotor 16 and the inner rotor 13 is kept stable, and the exciting current of the excitation winding 8 of the superconducting motor is constant, so that the superconducting offshore wind turbine can run safely, stably and reliably.

Specifically, the negative feedback transmission 25 includes a monitoring unit 26, a drive motor 11 and a gear transmission system. The drive motor 11 can be a servo motor or any other motor that can achieve the same function. The drive motor 11 is electrically connected with the monitoring unit. The gear transmission system includes a driving gear 10 fixed at an output end of the drive motor 11, a driven gear 19 fixed at the periphery of the outer rotor 16, and a support gear 17 opposite to the driving gear 10 for ensuring the rotational stability of the outer rotor 16. The drive motor 11 is fixedly mounted outside the shell 3, and the output shaft extends through the shell 3 to be fixedly connected with the driving gear 10 located inside the shell 3. The main body of the driven gear 19 is the outer rotor 16 of the rotary flux-pump wireless power supply device, and a carbon steel gear meshed with the driving gear 10 is embedded into the outer periphery of the outer rotor 16. The support gear 17 is rotatably arranged on one side, opposite to the driving gear 10, on the inner wall of the shell 3, thereby forming an effective and stable support for the rotating outer rotor 16.

The monitoring unit is controlled by traditional PID (Proportion Integration Differentiation). By collecting the rotational speed of the first rotating shaft 2 in real time and comparing the rotational speed of the first rotating shaft 2 with a rated value, the error is calculated, and the control quantity is calculated according to the error. The future error change is predicted, so that the torque of the driving motor 11 is adjusted in advance and then the rotational speed of the outer rotor 16 is adjusted. The rotational speed difference between the outer rotor 16 and the inner rotor 13 of the rotary flux-pump wireless power supply device is maintained, and the current of the excitation winding 8 of the superconducting motor is maintained constant.

The superconducting flux pump technology is introduced in the present disclosure, and non-contact rotary excitation is adopted. The flux is injected into the closed coil through non-electrical connection to compensate the current attenuation of the high-temperature superconducting magnets, without a traditional current lead. In this way, the leakage heat source formed by the bridge connection of the current lead between the room-temperature environment and the low-temperature environment and the joule heat of the current lead generated during the excitation operation are eliminated, the refrigerating requirement is reduced, and the energy utilization efficiency of the system is improved, and the slip ring structure is omitted through the modular design, so that the mechanical wear is optimized, and the complex maintenance of the system is reduced.

The non-contact rotary excitation induces a direct-current output in the high-temperature superconducting stator strips 12, which is not required for rectification by a separate rectifier. The structure of the superconducting wind turbine device is simpler, and there is no additional energy consumption, so that the energy utilization rate is effectively improved.

The electrical parameters output by the rotary flux-pump wireless power supply device is a direct-current output, so that the slip ring and an electric brush in the traditional wind turbine are omitted, the structure of the rotors of the superconducting wind turbine is simplified, the mechanical loss of the slip ring and the electric brush is eliminated, and overhaul and maintenance are facilitated.

In the inner rotor 13 of the rotary flux-pump wireless power supply device, each high-temperature superconducting stator strip 12 is connected separately with the excitation winding 8 of the superconducting motor to form a modular design. When one of the coils fails, the other superconducting coils can still operate reliably.

The rotary exciting outer rotor 16 of the rotary flux-pump wireless power supply device is transferred from the low-temperature Dewar flask into a room-temperature environment, so that frictional heat and conduction heat of the mechanical transmission shaft are effectively avoided, the refrigerating requirement for the refrigerator is reduced, and the refrigeration cost and operation and maintenance cost are reduced.

According to the rotary flux-pump wireless power supply device, the Dewar flask located between the inner rotor 13 and the outer rotor 16 is made of a G10 composite material. The G10 material has excellent insulating performance and high temperature resistance under the same thickness as conventional insulating materials. Therefore, the thickness can be reduced while maintaining the same electrical performance, so that the air gap space occupied between the inner rotor 13 and the outer rotor 16 is reduced, and the air gap between the inner rotor 13 and the outer rotor 16 can be compressed. The use of G10 composite material can effectively reduce the gap between the permanent magnets 15 and the high-temperature superconducting stator strips 12, so that the magnetic field intensity on the high-temperature superconducting stator strips 12 is increased, and the exciting current in the high-temperature superconducting twin-disk coil is increased.

Due to the offshore wind power is intermittent and fluctuating, the speed of the rotating shaft of the superconducting wind turbine continuously changes. The negative feedback transmission device is provided to monitor the rotational speed of the offshore wind turbine, adjust the rotational speed of the outer rotor 16, and maintain the rotational speed difference between the permanent magnets 15 and the high-temperature superconducting stator strips 12. In this way, the traveling wave magnetic field on the high-temperature superconducting stator strips 12 is kept stable, so that the exciting current input of the superconducting wind turbine is constant.

In the description of the present application, it needs to be illustrated that, except as otherwise noted, the terms such as "install", "link" and "connect" should be generally understood, for example, the components can be fixedly connected, and also can be detachably connected or integrally connected; the components can be mechanically connected, and also can be electrically connected; the components can be directly connected and also can be indirectly connected through an intermediate, and two components can be communicated internally. For any person skilled in the art, the specific meanings of the terms in the present disclosure can be understood according to specific conditions.

If the present disclosure discloses or relates to mutually fixedly connected parts or structural parts, unless otherwise stated, the fixedly connected parts or structural parts can be understood as that the parts or structural parts are detachably fixedly connected (for example, connection with bolts or screws), or can also be understood as non-detachably fixedly connected (for example, riveting and welding). Of course, the mutually fixedly connected parts or structural parts can also be replaced (except that it is obviously impossible to use an integral part forming process) by an integrated structure (for example, the integrated structure is integrally formed and manufactured with casting technology).

In addition, the terms used to denote a positional relationship or shape in any of the above-described technical schemes disclosed in the present disclosure include, unless otherwise stated, a state or shape approximate to, similar to, or adjacent to the technical scheme.

Any component provided by the present disclosure can be assembled from a plurality of individual components, or can be a single component manufactured by an integral forming process.

Adaptive changes made according to actual requirements are all within the protection range of the present disclosure.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, and therefore, all changes, including the meanings and scopes of equivalent elements, of the claims are aimed to be included in the present disclosure. Any mark of attached figures in the claims should not be regarded as limitation to the involved claims.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In summary, the contents of this

What is claimed is:

1. A wireless power supply system for a superconducting offshore wind turbine, comprising a shell, and a vacuum Dewar flask, a superconducting motor and a rotary flux-pump wireless power supply device which are arranged inside the shell, wherein a refrigerating apparatus is rotatably arranged inside the vacuum Dewar flask, and the refrigerating apparatus is driven to rotate by the offshore wind turbine;

the superconducting motor comprises an armature winding fixed on an inner wall of the shell and excitation windings uniformly arranged on an outer periphery of the refrigerating apparatus;

the rotary flux-pump wireless power supply device comprises an inner rotor and an outer rotor which are arranged opposite to each other, the inner rotor is arranged inside the vacuum Dewar flask, the outer rotor is arranged outside the vacuum Dewar flask, and the inner rotor and the outer rotor coaxially rotate with the excitation windings;

high-temperature superconducting stator strips are provided at an outer periphery of the inner rotor and electrically connected to the excitation windings in one-to-one correspondence;

permanent magnets are provided on one side, facing the inner rotor, of the outer rotor and in one-to-one correspondence with the high-temperature superconducting stator strips;

the outer rotor and the inner rotor rotate differentially, the permanent magnets induce a direct-current output voltage on the high-temperature superconducting stator strips, to input a direct current to the excitation windings, so as to form a magnetic field and induce an output voltage at the armature winding of the superconducting motor.

2. The wireless power supply system for a superconducting offshore wind turbine according to claim 1, wherein each of the excitation windings is a non-insulation twin-disk coil, and is formed by winding second-generation high-temperature superconducting strips YBCO (Yttrium Barium Copper Oxide) and stainless steel on an epoxy resin framework.

3. The wireless power supply system for a superconducting offshore wind turbine according to claim 2, further comprising a negative feedback transmission device for monitoring a rotational speed of a first rotating shaft of the offshore wind turbine and adjusting a rotational speed of the outer rotor according to the rotational speed of the first rotating shaft of the wind turbine.

4. The wireless power supply system for a superconducting offshore wind turbine according to claim 3, wherein the negative feedback transmission device comprises a monitoring unit, a drive motor electrically connected to the monitoring unit, a driving gear fixedly arranged at an output end of the drive motor, and a driven gear fixedly connected to the outer rotor.

5. The wireless power supply system for a superconducting offshore wind turbine according to claim 1, wherein the high-temperature superconducting stator strips on the inner rotor are independently wound in parallel.

6. The wireless power supply system for a superconducting offshore wind turbine according to claim 5, further comprising a negative feedback transmission device for monitoring a rotational speed of a first rotating shaft of the offshore wind turbine and adjusting a rotational speed of the outer rotor according to the rotational speed of the first rotating shaft of the wind turbine.

7. The wireless power supply system for a superconducting offshore wind turbine according to claim 6, wherein the negative feedback transmission device comprises a monitoring unit, a drive motor electrically connected to the monitoring unit, a driving gear fixedly arranged at an output end of the drive motor, and a driven gear fixedly connected to the outer rotor.

8. The wireless power supply system for a superconducting offshore wind turbine according to claim 1, wherein the high-temperature superconducting stator strips are welded and connected to the excitation windings through lead tin-soldering sheet soldered joints.

9. The wireless power supply system for a superconducting offshore wind turbine according to claim 8, further comprising a negative feedback transmission device for monitoring a rotational speed of a first rotating shaft of the offshore wind turbine and adjusting a rotational speed of the outer rotor according to the rotational speed of the first rotating shaft of the wind turbine.

10. The wireless power supply system for a superconducting offshore wind turbine according to claim 9, wherein the negative feedback transmission device comprises a monitoring unit, a drive motor electrically connected to the monitoring unit, a driving gear fixedly arranged at an output end of the drive motor, and a driven gear fixedly connected to the outer rotor.

11. The wireless power supply system for a superconducting offshore wind turbine according to claim 1, wherein an annular magnet yoke of the inner rotor is made of aluminum oxide.

12. The wireless power supply system for a superconducting offshore wind turbine according to claim 11, further comprising a negative feedback transmission device for monitoring a rotational speed of a first rotating shaft of the offshore wind turbine and adjusting a rotational speed of the outer rotor according to the rotational speed of the first rotating shaft of the wind turbine.

13. The wireless power supply system for a superconducting offshore wind turbine according to claim 12, wherein the negative feedback transmission device comprises a monitoring unit, a drive motor electrically connected to the monitoring unit, a driving gear fixedly arranged at an output end of the drive motor, and a driven gear fixedly connected to the outer rotor.

14. The wireless power supply system for a superconducting offshore wind turbine according to claim 1, wherein a part, located between the inner rotor and the outer rotor, of the vacuum Dewar flask is made of a G10 composite material.

15. The wireless power supply system for a superconducting offshore wind turbine according to claim 14, further comprising a negative feedback transmission device for monitoring a rotational speed of a first rotating shaft of the offshore wind turbine and adjusting a rotational speed of the outer rotor according to the rotational speed of the first rotating shaft of the wind turbine.

16. The wireless power supply system for a superconducting offshore wind turbine according to claim 15, wherein the negative feedback transmission device comprises a monitoring unit, a drive motor electrically connected to the monitoring unit, a driving gear fixedly arranged at an output end of the drive motor, and a driven gear fixedly connected to the outer rotor.

17. The wireless power supply system for a superconducting offshore wind turbine according to claim 1, wherein the refrigerating apparatus is fixedly connected to the offshore wind turbine by a first rotating shaft extending through the vacuum Dewar flask and the shell.

18. The wireless power supply system for a superconducting offshore wind turbine according to claim 1, wherein support members for mounting the refrigerating apparatus are provided inside the vacuum Dewar flask, and the refrigerating apparatus is rotatably connected to the support members by bearings.

19. The wireless power supply system for a superconducting offshore wind turbine according to claim 1, further comprising a negative feedback transmission device for monitoring a rotational speed of a first rotating shaft of the offshore wind turbine and adjusting a rotational speed of the outer rotor according to the rotational speed of the first rotating shaft of the wind turbine.

20. The wireless power supply system for a superconducting offshore wind turbine according to claim 19, wherein the negative feedback transmission device comprises a monitoring unit, a drive motor electrically connected to the monitoring unit, a driving gear fixedly arranged at an output end of the drive motor, and a driven gear fixedly connected to the outer rotor.

* * * * *